Feb. 15, 1966    W. W. ROBINSON, JR., ET AL    3,234,912
HOPPER FEED REGULATOR
Original Filed Jan. 11, 1963
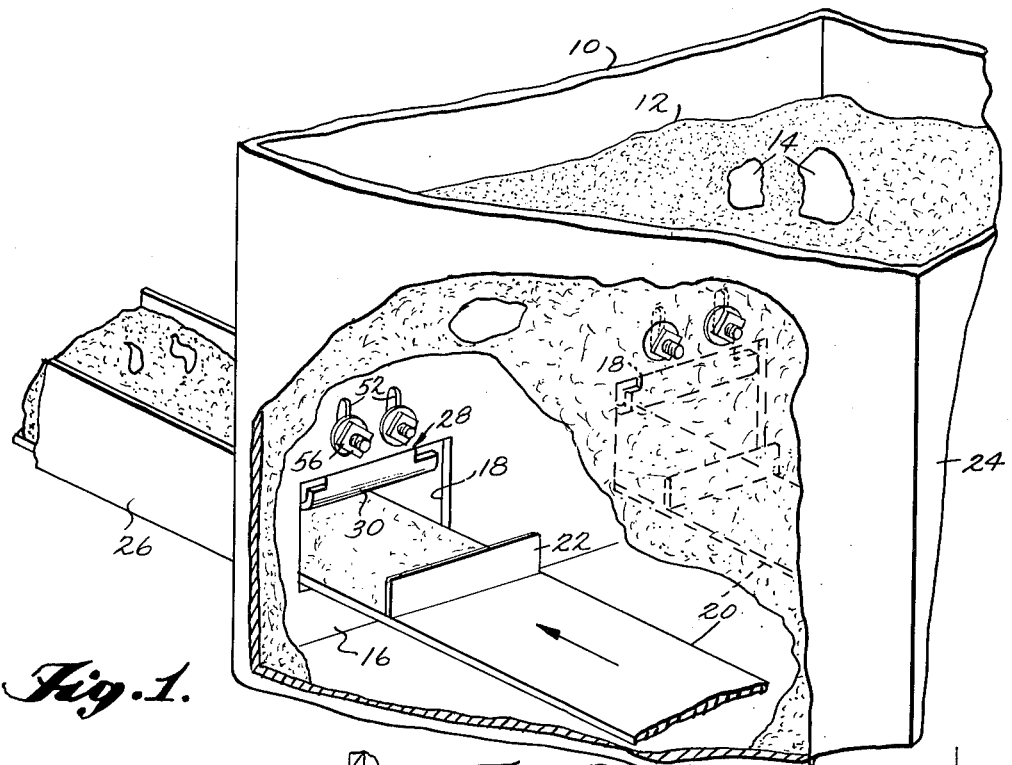
Fig. 1.
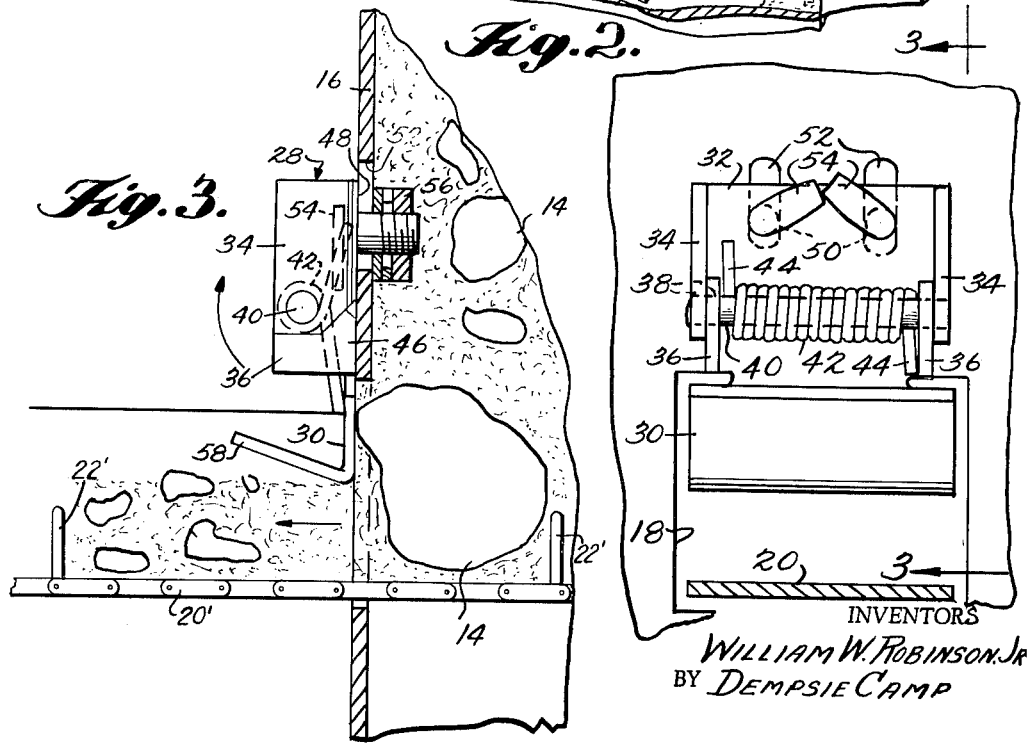
Fig. 2.
Fig. 3.
INVENTORS
*WILLIAM W. ROBINSON JR*
BY *DEMPSIE CAMP*
*ATTORNEYS*

United States Patent Office

3,234,912
Patented Feb. 15, 1966

3,234,912
HOPPER FEED REGULATOR
William W. Robinson, Jr., Signal Mountain, and Dempsie C. Camp, Dunlap, Tenn., assignors to Cumberland Case Company, Chattanooga, Tenn., a corporation of Tennessee
Continuation of application Ser. No. 250,886, Jan. 11, 1963. This application Oct. 27, 1964, Ser. No. 426,703
11 Claims. (Cl. 119—53)

The present invention relates to dispensing fluent material and more particularly to a hopper feed regulator, and is a continuation of an earlier application Serial No. 250,886, filed Jan. 11, 1963, now abandoned.

With the automation of the farming industry and other industries material distributing conveyers have increasingly displaced former methods of batch delivery. In the poultry industry in particular, it has been found to be advantageous to deliver feed for the fowls in endless conveyers which make circuits through the poultry feeding area. In the general case, feed is continuously picked up from a hopper by a slow moving or indexing conveyer having pushers or flights which move the feed in a trough. The conveyer is moved at a speed such that sufficient feed will be in the trough throughout the feeding area so as to satisfy all the fowls.

Poultry feed is generally supplied to poultry farms in bulk in granular form and has a tendency to become caked and lumpy when stored. Also feed quite often contains foreign matter such as wood chips, pebbles and corn cob fragments. Thus when poultry feed of this nature is dumped into the hopper of the feed conveyer, there is a marked tendency for lumps and pieces of foreign matter to clog the exits of the hopper and prevent feed from passing therethrough. This problem has been the cause of much anxiety to poultrymen who have had to spend valuable time checking the operation of their automatic feed conveyers, to make sure that feed is being conveyed properly and to unclog the feed exit apertures when they have become blocked.

It is therefore an object of the present invention to provide a hopper feed regulator that will prevent clogging of the feed exit aperture.

It is another object of this invention to provide a hopper feed regulator that is yieldable to pass lumps and pieces of foreign material from the feed hopper. It is a further object of the present invention to provide a hopper feed regulator that is adjustable to allow a predetermined depth of pulverulent material from a feed hopper and is resiliently mounted so as to permit passage of lumps and pieces of foreign material from the hopper that are of greater dimension than the predetermined depth.

These and other objects of the present invention are more fully set forth in the following detailed explanation in which reference is made to the attached drawing in which an illustrative embodiment of the invention is shown.

In the drawings:

FIGURE 1 is a fragmentary perspective view of a feed hopper employing feed regulators of the invention. A portion of the hopper wall and an amount of feed material have been removed so as to expose one of the feed regulators;

FIGURE 2 is a back elevation of the invention; and

FIGURE 3 is a fragmentary cross section of a feed hopper of a mechanical poultry feeder unit wherein the conveyer comprises a conveyer chain having upstanding flights showing a feed regulator of the invention, in elevation, in use therewith.

A feed hopper is illustrated at 10 in FIGURE 1 having an amount of pulverulent poultry feed 12 therein. Included in the feed 12 are several lumps and inclusions 14. Formed in one wall 16 of the hopper 10 near the bottom thereof is a feed exit aperture 18. (Two identical exits are shown in FIGURE 1.) Passing through the aperture 18 is a conventional endless conveyer 20, diagrammatically shown in FIGURES 1 and 2, which preferably has pushers 22 formed thereon. Conveyer 20 enters the hopper 10 through the wall 24, picks up feed in the hopper and passes out through apertures 18. The conveyer pushes the feed along in a trough 26 in which the conveyer 20 makes a circuit of the poultry feeding area and returns to the hopper 10 through the wall 24.

Users of automatic poultry feeders differ in the depth of feed they feel should be maintained in a feed trough. For instance some users prefer a nearly full trough so that the chickens can reach the food with greater ease; others prefer a more shallow feed depth feeling that in this manner the chickens will waste less feed by pecking and scratching it over the trough edge. In order to maintain the desired feed level in trough 26 and to gain other advantages as set forth below, a feed regulator 28 of the invention is mounted on the hopper wall 16 adjacent the outside of the hopper so as to protrude downwardly into the aperture 18.

The feed regulator 28 of the invention preferably comprises a gate 30 in the form of a strip of rigid material such as steel that is bent into the general shape of an "L." The feed regulator 28 includes a yieldable mounting comprising a mounting plate 32 having ears 34, bent approximately 90 degrees upwardly at each side thereof. Similar ears 36 are formed on the side edges of one leg of the gate 30 and bent upwardly so that the gate 30 is slightly narrower than the mounting plate 32. Holes 38 are then bored through the ears 34 and 36 and a pintle 40 carrying a torsion coil spring 42. The ends 44 of the spring 42 are arranged so as to urge the flat sides 46 and 48 of the gate 30 and mounting plate 32, respectively into rotative movement toward one another. Holes 50 are formed in the mounting plate 32 and cooperating vertical slots 52 are formed through the wall 16 of the hopper 10 above the aperture 18. The feed regulator 28 is mounted on the hopper 10 by passing suitable fasteners such as L bolts 54 through the holes 50 and slots 52 and threading nuts 56 thereon. The regulator is then adjusted so that the desired depth of feed can pass beneath the gate and the nuts 56 are then tightened. It is a simple matter to loosen the nuts 56 and raise or lower the regulator in the slots 52 to change the feed depth should the user desire to do so.

While the conveyor means has been diagrammatically illustrated in FIGURES 1 and 2 in the form of a belt or tape conveyor 20 carrying material pushing flights 22, other well known conveyor means such as a conveyor chain 20' having upstanding material pushing flights 22' as diagrammatically illustrated in FIGURE 3 of the drawings may be employed with the present invention. Similarly, the hopper feed regulator of the present invention can be employed with poultry feed conveyor chain of the type disclosed in our copending application, Serial No. 327,575, filed November 21, 1963, and issued as U.S. Patent 3,189,164.

As best shown in FIGURE 3, the regulator 28 is positioned so that the gate 30 protrudes downwardly into the aperture 18 and restricts the depth of the feed that is carried from the hopper 10 by the conveyor. Leg 58 projects outwardly in the direction of feed travel from the lower extent of the gate 30. When, during the course of conveying the feed conveyor pushers or flights 22′ propel a piece of foreign matter to the aperture 18 that is larger than the distance between the conveyor chain 20′ and the bottom of the gate 30, the foreign matter pushes the gate outwardly and upwardly in rotation about the spring carrying pintle 40. After the foreign matter has passed through the aperture 18, the spring 42 urges the gate back to the rest position shown.

It can thus be seen that the feed regulator of the invention, while assuring that the proper predetermined level of feed will issue from the hopper, effectively acts upon pieces of foreign matter so as to prevent the foreign matter from clogging the hopper aperture. The force constant of the spring 42 is such that gate 30 will restrict the aperture while pulverulent feed is passing therethrough, but will yield to permit the passing of foreign matter through the aperture.

It should be noted that the upturned relationship of the leg 58 with respect to the gate 30 is of particular significance. During normal operation of the feeder the conveyor chain 20′ is moved in the direction of the arrow (FIGURE 3). Should the chain become caught at some point in the feeder system, for instance at the drive mechanism or at a point where the conveyor turns a corner, an automatic disengage mechanism associated with the drive mechanism (not shown) prevents serious damage to the system. However when the disengage mechanism operates there may be a sudden backlash of the conveyor chain 20′ imparting an undulated lift to the chain together with reverse motion. When this happens the chain flights 22′ near the feed regulator are deflected downwardly by the angled leg 58 so that they settle back into the trough and do not become caught on the hopper feed regulator.

Although the hopper feed regulator of the invention has been shown in conjunction with the conveying of poultry feed, it is clear that the particular material is not a limitation and that the invention is applicable to use with other pulverulent, granular or friable materials having lumps or foreign inclusions of larger size.

While the feed regulator as described hereinabove constitutes a preferred embodiment of the invention, it is to be understood that various alterations and modifications can be made to the embodiment shown without departing from the principles of this invention and therefore, the invention is limited only by the spirit and scope of the following claims.

What is claimed is:

1. In combination a feed hopper having an aperture in a side wall thereof, an endless circuit including a poultry feeding trough communicating with the interior of said hopper through said aperture, endless conveyor means extending throughout said circuit for moving lumpy, pulverulent feed from the hopper through the aperture into and throughout the trough, said conveyor comprising a generally horizontally extending endless portion having a transverse width substantially equal to the width of said aperture and a plurality of longitudinally spaced, generally transversely extending, upstanding material pushing flights on said horizontally extending portion, and feed regulating means comprising a gate mounted on the hopper side wall outside the hopper, said gate being vertically adjustable into greater and less restriction of said aperture to thereby regulate the depth of the material conveyed by said endless conveyor means so that the adjustable downward extent of the gate and the upper extent of said flights define means for coacting to operate upon lumps of feed which are being propelled by the flights and which project upwardly beyond the flights into the relatively narrow space defined between the gate and the flights a sufficient distance to engage the gate, said gate being swingable outwardly of said feed hopper and away from the aperture in response to force exerted thereon by lumps of feed conveyed thereagainst by said moving means to thereby permit the passage of said lumps of feed from said feed hopper through said aperture and resilient means operative to urge said gate to return to its feed depth regulating position after said passage of said lumps of feed through said aperture.

2. The combination defined in claim 1 wherein the conveyor comprises a chain-type conveyor.

3. The combination including a feed hopper for lumpy and pulverulent material having an aperture in a side wall thereof, an endless conveyor for removing pulverulent material from said hopper, said conveyor comprising a generally horizontally extending endless portion having a transverse width substantially equal to the width of said aperture and a plurality of longitudinally spaced, generally transversely extending, upstanding material pushing flights on said horizontally extending portion, the conveyor being movable in a path which includes passing into said hopper and out through said aperture and a feed regulator including an aperture restricting gate, resiliently urged into adjacency with said aperture by a spring, said spring having a force constant greater than the force exerted by pulverulent material conveyed thereagainst and exceeded by the force exerted by a lump of material larger than said restricted aperture moved against said gate by the conveyor whereby said large lump urges the gate into non-restricting relationship with the aperture and moves through said aperture, said gate being thereafter returned to restricting position by said spring.

4. Apparatus as set forth in claim 3 wherein the gate is adjustable into greater and less restriction of the hopper aperture whereby the amount of pulverulent material movable through said aperture is controlled.

5. The combination set forth in claim 3 wherein the aperture restricting gate is arranged to depend into said aperture a distance sufficient to coact with the conveyor to nearly block said aperture when a material pushing flight on said conveyor is passing through said aperture.

6. The combination set forth in claim 3 wherein the gate urging spring is a coil spring.

7. The combination defined in claim 3 wherein the conveyor comprises chain.

8. The apparatus of claim 4 wherein the gate is detachable from the hopper.

9. A hopper for containing pulverulent material, said hopper having an entrance and an exit aperture in the side walls thereof; an endless conveyor having a section thereof disposed within the hopper, said conveyor comprising a generally horizontally extending endless portion having a transverse width substantially equal to the width of said aperture and a plurality of longitudinally spaced, generally transversely extending, upstanding material pushing flights on said horizontally extending portion, said conveyor extending through the entrance and exit apertures; and a feed regulator comprising a gate yieldably mounted on the hopper adjacent said exit aperture, as to restrict the size of the aperture, said gate restricting the depth of pulverulent material conveyable from the hopper and being swingable outwardly from the hopper in response to lumps of said material urged thereagainst by said conveyor, the adjustable downward extent of the gate and the upper extent of said flights also defining means for coacting to operate upon lumps of feed propelled by the flights and projecting upwardly beyond the flights into the relatively narrow space defined between the gate and the flights a sufficient distance to engage the gate and a leg mounted on said gate, said leg projecting outwardly from the hopper and upwardly from the conveyor, said leg being arranged to deflect the conveyor flights downwardly should a jamming of the conveyor result in a sudden backlash of the conveyor and undulating lift to the flights.

10. The structure defined in claim 9 wherein the conveyor comprises chain.

11. The combination set forth in claim 3 wherein the said apparatus includes a trough extending downstream of said aperture and through which said conveyor travels and into which the pulverulent material is delivered.

References Cited by the Examiner
UNITED STATES PATENTS

| | | | |
|---|---|---|---|
| 783,186 | 2/1906 | Ericsson | 198—62 |
| 2,489,498 | 11/1949 | Palmer | 198—37 |
| 2,652,808 | 9/1953 | Wagner | 119—52 |
| 2,745,539 | 5/1956 | Hazen | 198—37 |
| 2,866,536 | 12/1958 | Smallegan | 119—52 |
| 3,058,571 | 10/1962 | Emrick | 119—52 |

SAMUEL KOREN, *Primary Examiner.*
ALDRICH F. MEDBERY, *Examiner.*